(12) United States Patent  (10) Patent No.: US 8,823,973 B2
Takahashi et al.  (45) Date of Patent: Sep. 2, 2014

(54) IMAGE FORMING APPARATUS FOR STARTING A PREPARATION OPERATION WITHOUT RECEIVING INFORMATION ABOUT AN ACCESSORY DEVICE

(75) Inventors: Keita Takahashi, Abiko (JP); Mitsuhiko Sato, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 12/476,602

(22) Filed: Jun. 2, 2009

(65) Prior Publication Data

US 2009/0310177 A1  Dec. 17, 2009

(30) Foreign Application Priority Data

Jun. 13, 2008  (JP) .................................. 2008-155358

(51) Int. Cl.
*G06F 3/12* (2006.01)
*G06K 15/00* (2006.01)
*G06K 1/00* (2006.01)
*G06F 15/00* (2006.01)

(52) U.S. Cl.
USPC ........................... 358/1.15; 358/1.14; 358/1.9

(58) Field of Classification Search
None
See application file for complete search history.

(56) References Cited

U.S. PATENT DOCUMENTS

| 6,714,313 | B1 * | 3/2004 | Sugaya | 358/1.15 |
| 2002/0109857 | A1 * | 8/2002 | Ueno et al. | 358/1.14 |
| 2003/0162556 | A1 * | 8/2003 | Libes | 455/507 |
| 2005/0219602 | A1 * | 10/2005 | Mikami | 358/1.14 |
| 2006/0227361 | A1 * | 10/2006 | Sakurai | 358/1.14 |
| 2007/0165262 | A1 * | 7/2007 | Watanabe et al. | 358/1.14 |
| 2008/0079993 | A1 * | 4/2008 | Kanamoto | 358/1.15 |

FOREIGN PATENT DOCUMENTS

| JP | 11-005349 A | 1/1999 |
| JP | 11-007343 A | 1/1999 |
| JP | 11-129579 A | 5/1999 |
| JP | 2002-354165 A | 12/2002 |
| JP | 2006-023611 A | 1/2006 |
| JP | 2006-192853 A | 7/2006 |
| JP | 2006-326861 A | 12/2006 |

* cited by examiner

*Primary Examiner* — Ming Hon
(74) *Attorney, Agent, or Firm* — Canon U.S.A., Inc. IP Division

(57) ABSTRACT

An image forming apparatus, to which an accessory device is connectable, includes a control unit configured to control the image forming apparatus to start a preparation operation in which an image forming unit can form an image in response to a power supply, and a storage unit configured to store a connecting state between the image forming apparatus and the accessory device. The control unit determines, in response to the start of the power supply, whether the accessory device has been connected to the image forming apparatus before the power supply is stopped, with reference to information stored in the storage unit. Then, the control unit controls the image forming apparatus to start the preparation operation without waiting for the receiving of the information about the accessory device therefrom if the accessory device has not been connected to the image forming apparatus.

10 Claims, 9 Drawing Sheets

FIG.9

| TYPES OF SHEET DISCHARGE ACCESSORIES | TIME LIMIT TL2 |
|---|---|
| STAPLER | 1 sec |
| SORTER | 1 sec |
| PUNCHER | 1 sec |
| INSERTER | 2 sec |
| STACKER | 2 sec |

IMAGE FORMING APPARATUS FOR STARTING A PREPARATION OPERATION WITHOUT RECEIVING INFORMATION ABOUT AN ACCESSORY DEVICE

BACKGROUND OF THE INVENTION

1. Field of the Invention

The present invention relates to an image forming apparatus to which various accessories are attachable. More specifically, the present invention relates to an image forming apparatus that starts a preparation operation in which the image forming apparatus can form an image in response to a start of power supply.

2. Description of the Related Art

Conventionally, some image forming apparatuses, e.g., copying machines and printers, have a power saving mode (sleep mode) function for stopping functions other than predetermined functions for the purpose of saving power. In these image forming apparatuses, it is preferable to reduce the time period for starting up an image forming apparatus when the image forming apparatus returns from the power saving mode to the normal operation mode, i.e., to reduce a user's waiting time.

A method is discussed, in Japanese Patent Application Laid-open No. 11-007343, that data held in a working RAM is moved in a non-volatile RAM when the image forming apparatus enters into the power saving mode, and then, the data saved in the non-volatile RAM returns to the working RAM when the image forming apparatus returns from the power saving mode. Accordingly, the recovery time for the image forming apparatus from the power saving mode can be reduced.

A method is discussed, in Japanese Patent Laid-open No. 2002-354165, that the state of the image forming apparatus entering into the power saving mode is stored in a non-volatile memory when the image forming apparatus enters into the power saving mode, the non-volatile memory is checked when the image forming apparatus is powered on. Then, an initialization sequence is omitted if it is determined that the image forming apparatus is in the state of recovering from the power saving mode.

In the above described circumstances, various accessories, such as a finisher, are connected to the image forming apparatus as optional devices. Accordingly, the image forming apparatus checks types or states of the accessories connected to the image forming apparatus at the time the image forming apparatus is powered on. The image forming apparatus waits for a predetermined time period to determine whether information as to the types or the states of the connected accessories is received from each of the accessories. If the image forming apparatus receives no information from the accessories, the image forming apparatus determines that no accessories are connected thereto. The checking of the types or the states of the accessories is also performed when the image forming apparatus returns from the power saving mode, which may minimize or prevent the reduction of the recovery time required for the image forming apparatus to return from the power saving mode.

A method is discussed, in Japanese Patent Application No. 2006-326861, that the recovery time required for the image forming apparatus to return from the power saving mode is reduced by omitting to check the types of the accessories when the image forming apparatus returns from the power saving mode. In this method, the image forming apparatus is provided with a signal line in order to detect attachment or detachment of the accessories while the image forming apparatus is in the power saving mode, and stores information of the accessories before the image forming apparatus enters into the power saving mode. When attachment or detachment of the accessories is detected while the image forming apparatus is in the power saving mode, the attachment or detachment history is stored. When the image forming apparatus returns from the power saving mode, if the attachment or detachment history while the image forming apparatus is in the power saving mode is not found, the image forming apparatus returns from the power saving mode by using the information of the accessories stored before entering into the power saving mode. In Japanese Patent Application Laid-Open No. 11-005349, a method is discussed that, in a case where status information of each optional unit is stored in an electrically erasable programmable read-only memory (EEPROM) before the image forming apparatus enters into a sleep state and the image forming apparatus returns from the sleep state according to an easy start-up process, the image forming apparatus starts a printing process by regarding each optional unit as being in the status of the information stored in the EEPROM.

However, in the method as discussed in Japanese Patent Application Laid-Open No. 2006-326861, it is required to provide an additional signal line in order to detect the accessories attached or detached while the image forming apparatus is in the power saving mode, which increases cost. Further, since the above method requires power to monitor the attachment or the detachment of the accessories while the image forming apparatus is in the power saving mode, power saving is disturbed. Still further, in the methods as discussed in Japanese Patent Application Laid-Open Nos. 2006-326861 and 11-005349, states of the accessories or the optional units may change while the image forming apparatus is in the power saving mode or in the sleep state. The states of the accessories may change during the power saving mode, for example, in such a case where a sheet on a sheet discharge tray of a finisher is collected by a user or a case where staples of a stapler are supplied while the image forming apparatus is in the power saving mode. Consequently, it is required to check the types or the states of the accessories when the image forming apparatus returns from the power saving mode.

SUMMARY OF THE INVENTION

The present invention is directed to an image forming apparatus which does not require an additional signal line during a power saving mode, can deal with status changes of the accessories during the power saving mode, and can reduce the recovery time required for the image forming apparatus to return from the power saving mode.

According to an aspect of the present invention, an image forming apparatus, to which an accessory device is connectable, includes an image forming unit configured to form an image on a sheet, a control unit configured to start a preparation operation in which the image forming unit can form the image, in response to a start of power supply, a receiving unit configured to receive information as to the accessory device from the accessory device, and a storage unit configured to store a connection state between the image forming apparatus and the accessory device, wherein the control unit determines, in response to the start of power supply, whether the accessory device has been connected to the image forming device before the power supply is stopped, with reference to information stored in the storage unit, and if the accessory device has not been connected to the image forming apparatus, the control unit controls the image forming apparatus to start the preparation operation without waiting for the receiving of the information by the receiving unit from the accessory device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates a table for setting a time limit TL2.

DESCRIPTION OF THE EMBODIMENTS

Various exemplary embodiments, features, and aspects of the invention will be described in detail below with reference to the drawings.

Figure 1:
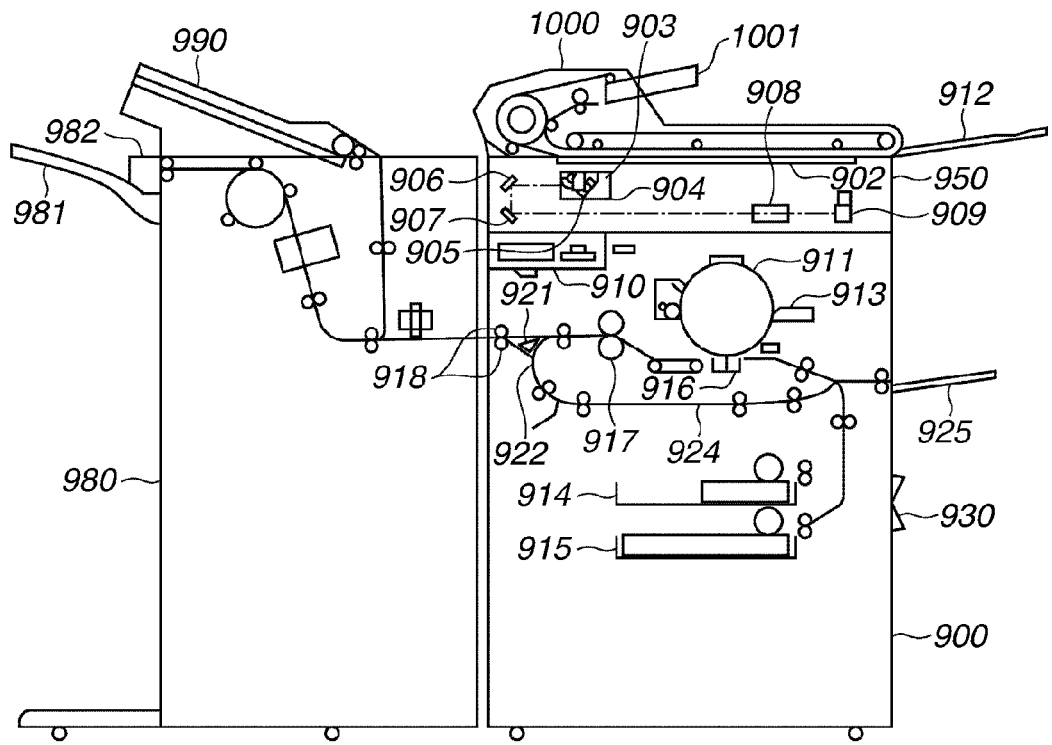
FIG. 1 is a schematic cross sectional view of an image forming apparatus according an exemplary embodiment of the present invention.

FIG. 1 is a cross sectional view of an image forming apparatus 900 and accessories according to an exemplary embodiment of the present invention. The accessories, e.g., a document feeding apparatus 1000, a document reading apparatus 950, and a finisher 980, are attachable to the image forming apparatus 900. The document feeding apparatus 1000 transmits documents placed on a document tray 1001 one by one from a top page thereof from the left side to the right side on a platen glass 902 through a curved path to thereby discharge the documents to a discharge tray 912. With regard to the documents conveyed on the platen glass 902, each of the documents on the paten glass 902 is irradiated with light of a lamp 903 of a document reading unit 904 that rests at a predetermined position. Reflected light from the document is led to a reading sensor 909 through mirrors 905, 906, 907, and a lens 908, where a document image thereof is read by the reading sensor 909. The document can be read by stopping the document after it is conveyed onto the platen glass 902 and then moving the document reading unit 904 from the left side to the right side by the document feeding apparatus 1000.

The document image read by the reading sensor 909 is subjected to an imaging process and sent to an exposure control unit 910. Laser light emitted from the exposure control unit 910 is irradiated on a photosensitive drum 911 to form an electrostatic latent image on the photosensitive drum 911. The electrostatic latent image formed on the photosensitive drum 911 is developed with toner by means of a development device 913. Toner on the photosensitive drum 911 is transferred to a sheet supplied from any one of cassettes 914, 915, a manual feed unit 925, or a two-side conveyance path 924 by means of a transfer charging device 916. The sheet on which toner is transferred is subjected to a toner fixing process by a fixing unit 917. The sheet having passed through the fixing unit 917 is once led to a path 922 by a flapper 921 and switched back after a trailing edge of the sheet passes through the flapper 921 to be further led to discharging rollers 918 by the flapper 921. Accordingly, the sheet is discharged from the image forming apparatus 900 passing through the discharging rollers 918, with the surface of the sheet on which the toner is transferred facing down.

Incidentally, when an image is formed on a hard sheet, such as an OHP sheet, provided through the manual feed unit 925, the sheet is not led to the path 922 but is discharged through the discharging rollers 918 with the surface of the sheet on which the toner is transferred facing up. Further, when an image is formed on both sides of the sheet, the sheet is straightly led to the discharging rollers 918 from the fixing unit 917 and switched back immediately after a trailing edge of the sheet passes through the flapper 921 to be further led to the two-side conveyance path 924 by the flapper 921. The sheet discharged through the discharging rollers 918 is sent to the finisher 980. The finisher 980 performs a finishing process such as a shifting process, a binding process, and a punching process for sheets. An inserter 990 installed on the finisher 980 supplies a cover, a slip sheet, or the like to the finisher 980. Further, when a shift-sorting process, in which sheets are discharged in such a manner that the sheets are shifted to one another, an alignment plate 982 discharges the sheets at the rear or the front of the tray 981 by moving the sheets in a vertical direction with respect to a sheet conveyance direction. Further, a hard switch 930 is a switch for supplying electrical power to the image forming apparatus in its entirety.

Figure 2:
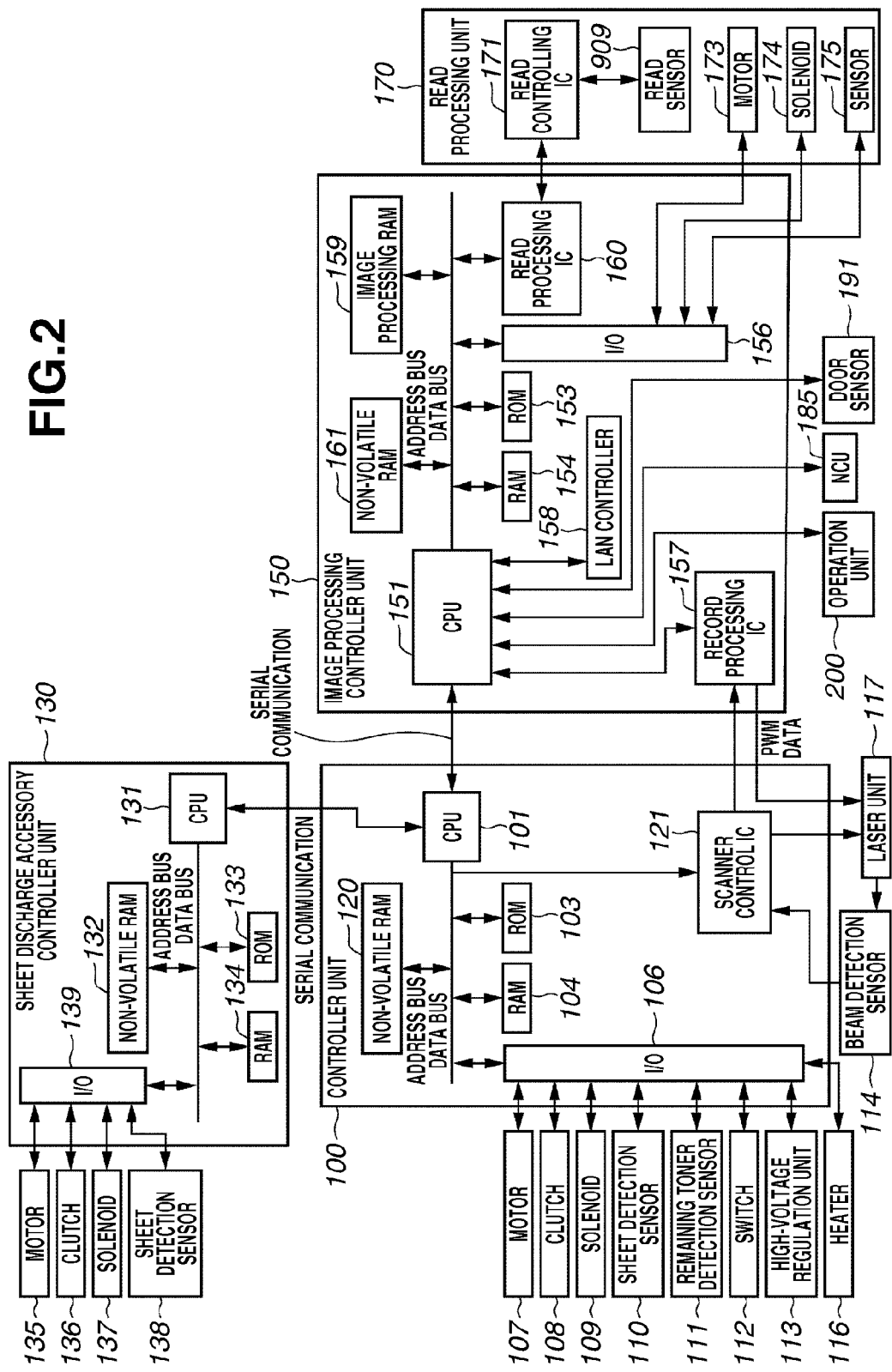
FIG. 2 is a block diagram illustrating a configuration of the image forming apparatus.

FIG. 2 is a control block diagram of the image forming apparatus. The controller unit 100 is responsible for sheet conveyance of the image forming apparatus 900 and image forming control of the high-voltage unit, the laser unit, the fixing device, and the like. A central processing unit (CPU) 101 sequentially reads control programs from a read-only memory (ROM) 103 in which control programs of the image forming apparatus are stored and executes read control programs. The CPU 101 and the respective units are connected to each other through an address bus and a data bus. Further, a random access memory (RAM) 104 is used for storing input data or as a working space, or the like. A non-volatile RAM 120 is used as a storage area of parameters with respect to an image forming operation.

Through an I/O interface 106, a motor 107 for driving a paper feeding system, a paper conveyance system and an optical system, a clutch 108, a solenoid 109, a sheet detection sensor 110 for detecting sheets to be conveyed, or the like are connected to each of the units. The development device 913 includes therein a remaining toner detection sensor 111 in order to detect the amount of toner remaining in the development device. An output signal of the development device 913 is input to the I/O interface 106. A signal of a switch 112 in order to detect a home position of each of the units is also input to the I/O interface 106. In response to an instruction of the CPU 101, the high-voltage regulation unit 113 outputs a high voltage to a primary charging device, the development device 913, a pre-transfer charging device, a transfer charging device 916, and a separation charger. An alternating current (AC) voltage is supplied to a heater 116 made of a ceramic board and the like according to an ON/OFF signal.

An image processing controller unit 150 performs image processing on an image signal received from connected external devices such as a read processing unit 170 or personal computers (PCs), and generates data to be written in the laser unit 117. The image processing controller unit 150 also can perform image processing on the image signal received from the read processing unit 170, and store the image data in the storage medium such as a Universal Serial Bus (USB) memory connected to a PC or an operation unit 200. The read processing unit 170 controls the document feeding apparatus 1000 and the document reading apparatus 950.

A CPU 151 of the image processing controller unit 150 sequentially reads programs from a ROM 153, in which image processing control programs are stored, and executes read programs. Further, the RAM 154 is used for storing input data or as a working space, or the like.

A record processing IC 157 performs image processing on an image signal received from the read processing unit 170 and the connected external devices such as a PC to generate pulse width modulation (PWM) data, which is output to the laser unit 117 installed in the exposure control unit 910. The laser unit 117 turns on a laser according to the PWM data. The laser beam from the laser unit 117 is irradiated on the photosensitive drum 911 to expose the photosensitive drum 911 with the laser beam. Further, the laser beam irradiated from the laser unit 117 is detected in a non-image region by a beam detect (BD) sensor 114 installed in the exposure control unit 910, and an output signal of the BD sensor 114 (BD signal) is input to a scanner control IC 121. The scanner control IC 121 performs rotation control of a polygon motor, which drives a polygon mirror in the exposure control unit 910 for scanning the laser beam, and outputs an image synchronization signal to the image processing controller unit 150 based on the BD signal.

A non-volatile RAM 161 is used as a memory area of parameters with respect to the image processing. A motor 173, a solenoid 174, a sensor 175, or the like of the read processing unit 170 are connected to an input/output (I/O) interface 156. A read processing IC 160 processes image data received from a reading sensor 909 installed in the read processing unit 170 and drives the reading sensor 909 via a read controlling unit 171. An image processing RAM 159 is used as a memory area for temporarily storing data received by the read processing IC 160 and data from the connected external devices such as a PC when those data are subjected to the image processing. A local area network (LAN) controller 158 controls communication between the image forming apparatus and the external devices, such as a PC, connected to the image forming apparatus through LAN cables.

The CPU 151 also controls an operation unit 200 (a user interface) that allows a user to operate the image forming apparatus and a network control unit (NCU) 185 for controlling facsimile communication. Further, a detection result of a door sensor 191, which detects an opening/closing state of a door, is input to the CPU 151.

The CPU 101 of the controller unit 100 and the CPU 151 of the image processing controller unit 150 are connected to each other via an asynchronous serial communication (start-stop transmission) or a clock synchronous serial communication. According to the communication between the CPU 101 and the CPU 151, the timing at which image data is output to an engine unit of the image forming apparatus, start up, shut down, and shifting to the power saving mode of the image forming apparatus are controlled.

A sheet discharge accessory controller unit 130 controls a finisher 980 as a sheet discharge accessory (optional unit). A CPU 131 sequentially reads programs from a ROM 133, in which programs for controlling the finisher 980 are stored, and executes read programs. The CPU 131 and each of the units are connected to each other through an address bus and a data bus. Further, a RAM 134 is used for storing input data or as a working space, or the like. A non-volatile RAM 132 is used as a storage area for storing parameters with respect to a paper discharge operation.

An I/O interface 139 is connected to each unit such as a motor 135 for driving a conveyance system and an optical system, a clutch 136, a solenoid 137, a sheet detection sensor 138 for detecting sheets to be conveyed, and the like.

The CPU 101 of the controller unit 100 and the CPU 131 of the sheet discharge accessory controller unit 130 are connected to each other via an asynchronous serial communication (start-stop transmission) or a clock synchronous serial communication. According to the communication between the CPU 101 and the CPU 131, the timing at which a sheet is delivered from the image forming apparatus to the finisher 980, a paper discharge process, and the image forming apparatus shifting to the power saving mode are controlled. Further, the controller unit 100, via communication with the image processing controller unit 150 and the sheet discharge accessory controller unit 130, notifies information to each other.

Figure 3:
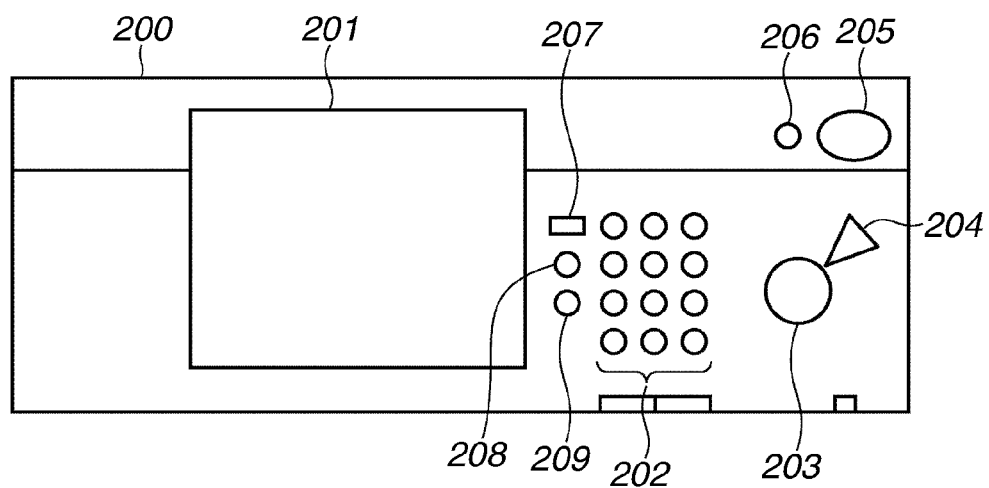
FIG. 3 is an external view of an operation unit.

FIG. 3 is an external view of the operation unit 200 of the image forming apparatus. Through a touch panel type LCD display unit 201, mode setting, state display, and the like of the image forming apparatus can be performed. A ten key 202 includes numerical keys from 0 through 9 and a clear key to be used for resetting a set numerical number to a default value. A user mode key 209 is used for bringing the image forming apparatus into an adjustment mode in which a default value for each function of the image forming apparatus can be set and a gradation correction can be adjusted according to a user's request. With the user mode key 209, various network settings such as the setting of an Internet Protocol (IP) address can be made. A start key 203 is used for executing a copying function, a scanning function, and the like. A stop key 204 is used for terminating jobs such as the copying function, a printing function, and the scanning function.

A soft power supply key 205 is used for shifting the image forming apparatus to the power saving mode and for recovering from the power saving mode. Only a LAN controller 158 is turned on while the image forming apparatus is in the power saving mode. In the image forming apparatus according to the present exemplary embodiment, the power saving mode is released by receiving a communication command via the LAN cable or a signal from the switch of the operation unit 200, and thereby the power saving mode can be shifted to the normal operation mode. A power saving mode key 206 is a key a user presses in order to adjust the temperature of the fixing unit 917 to a level set in a user mode. A reset key 207 is used for resetting a function set by the LCD display unit 201 or the ten key 202 to a default value. A guide key 208 is used for displaying an explanation of each of the copying function, the printing function, the scanning function, or the like set via the LCD display unit 201.

Figure 4:
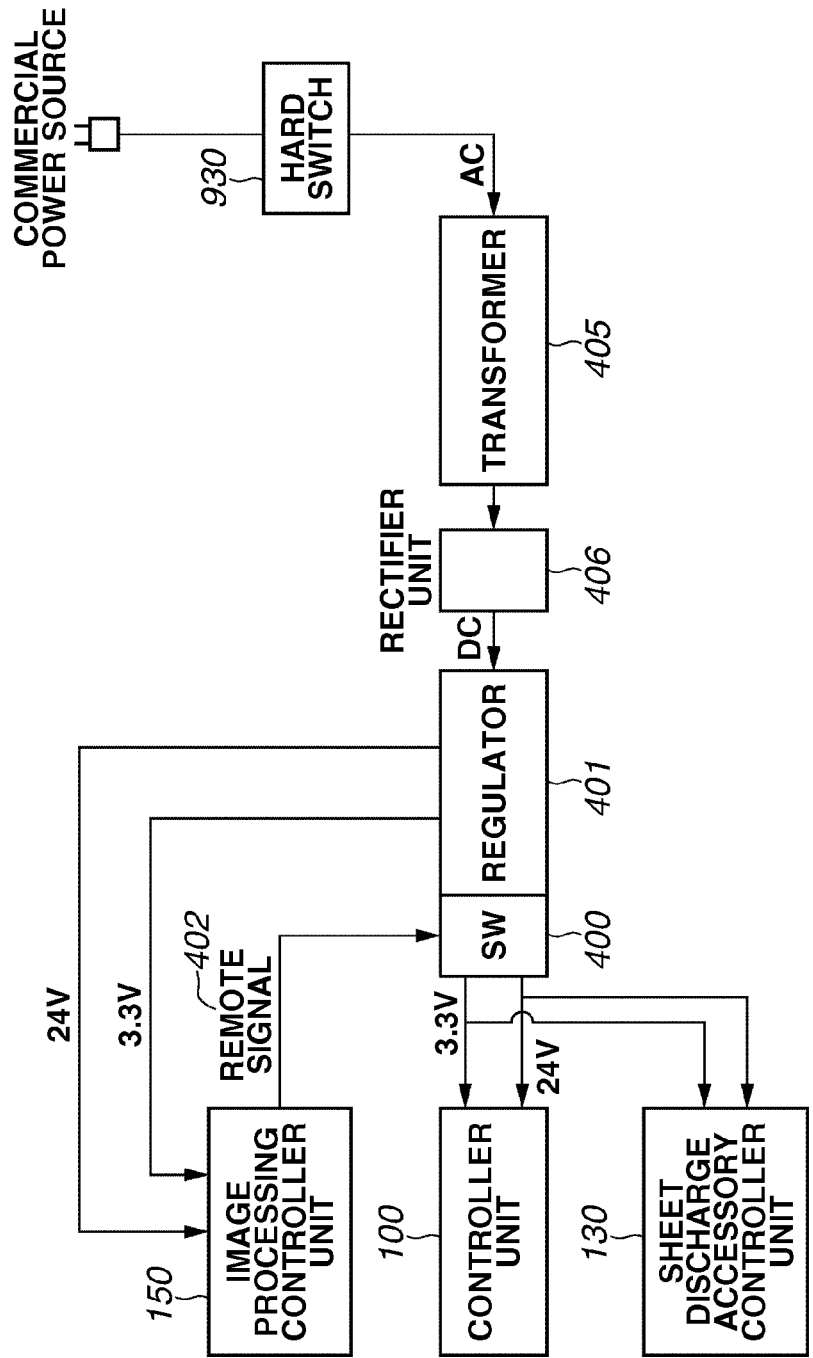
FIG. 4 is a schematic diagram illustrating a power supply unit.

FIG. 4 is a block diagram illustrating a configuration of a power source of the image forming apparatus. When the hard switch 930 is turned on, commercial power is supplied to a regulator 401 through a transformer 405 and a rectifier unit 406. The regulator 401 generates voltages of 3.3 V and 24 V and supplies the voltages to the image processing controller unit 150, the controller unit 100, and the sheet discharge accessory controller unit 130. A field effect transistor (FET) switch 400 can switch the power supply to the controller unit 100 and the sheet discharge accessory controller unit 130. A remote signal 402 is used for controlling the ON/OFF state of the FET switch 400, and is controlled by the image processing controller unit 150.

The image processing controller unit 150 notifies start of the power saving mode to the controller unit 100 via serial communication in response to a command from the operation unit 200 to start the power saving mode. Thereafter, the image processing controller unit 150 turns off the remote signal 402 to stop the power supply to the controller unit 100 and the sheet discharge accessory controller unit 130. The image processing controller unit 150 turns on the remote signal 402 to start the power supply to each of the controller units in response to a command from the operation unit 200 to return from the power saving mode. Then, the image processing controller unit 150 notifies the controller unit 100 via the serial communication that the image forming apparatus is returned from the power saving mode. In synchronization with the power supply to the controller unit 100, power is supplied to the image forming unit including the motor 107, the clutch 108, the solenoid 109, the high-voltage regulation unit 113, the heater 116, the laser unit 117, or the like. Further, in synchronization with the power supply to the sheet discharge accessory controller unit 130, power is supplied to the sheet conveyance unit including the motor 135, the clutch 136, the solenoid 137, and the like.

Figure 5:
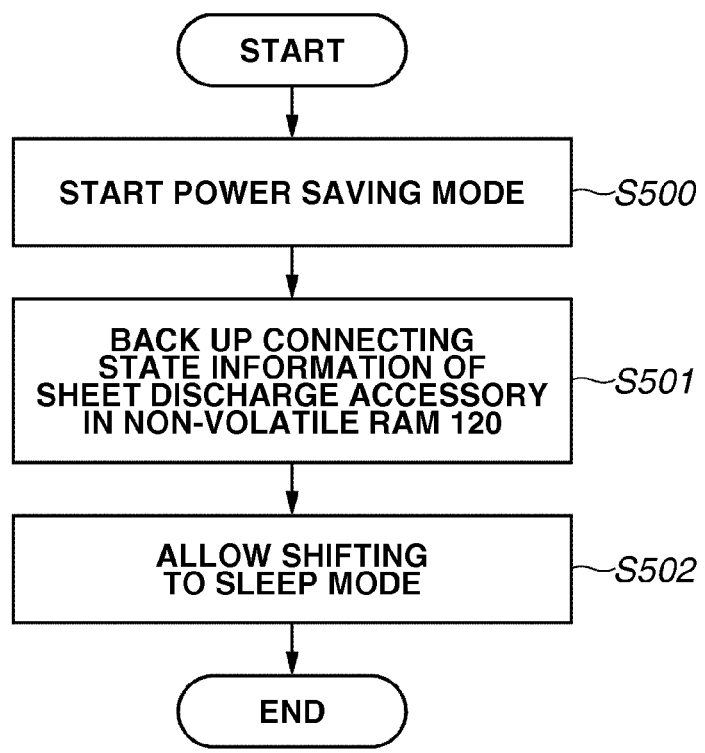
FIG. 5 is a flow chart illustrating a state when the image forming apparatus is shifted to a power saving mode.

FIG. 5 is a flowchart illustrating a process the controller unit 100 performs when the image forming apparatus is brought into the power saving mode. In step S500, the controller unit 100 is notified from the image processing controller unit 150 that the image forming apparatus is brought into the power saving mode. In step S501, the controller unit 100 performs a back up of connecting state information of the sheet discharge accessory in the non-volatile RAM 120. The connecting state information includes the presence or the absence of the sheet discharge accessory and the type of the sheet discharge accessory that is connected to the image forming apparatus. In step S502, the controller unit 100 notifies allowance of shifting to the power saving mode to the image processing controller unit 150. The image processing controller unit 150, after receiving the notification of the allowance of shifting to the power saving mode, turns off the remote signal 402 and shifts the image forming apparatus to the power saving mode.

Figure 6:
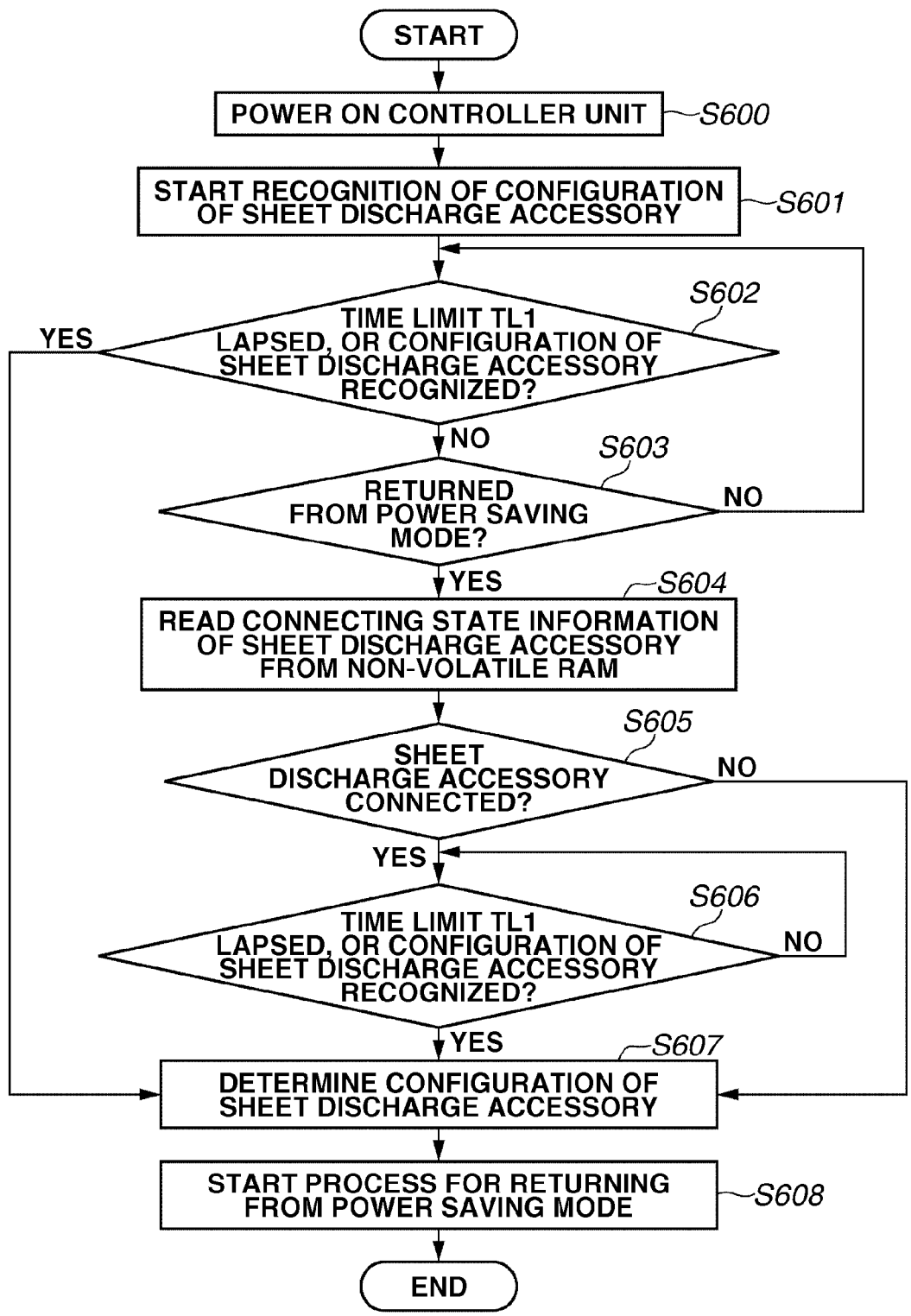
FIG. 6 is a flowchart illustrating a process when the image forming apparatus returns from the power saving mode.

FIG. 6 is a flowchart illustrating a controlling process that the controller unit 100 executes. When the soft power supply key 205 is pressed, or when the LAN controller 158 receives a printing job, the image processing controller unit 150 turns on the remote signal 402. In step S600, when the image processing controller unit 150 turns on the remote signal 402, the controller unit 100 and the sheet discharge accessory controller unit 130 are supplied with power.

In step S601, when the supply of power is started, the controller unit 100 starts to recognize the configuration of the sheet discharge accessory. More specifically, the controller unit 100 waits for reception of configuration information (the presence or the absence of a stapler, the number of trays held by the sheet discharge accessory, or the like) and control information (the sheet conveyance speed that a sheet is delivered between the devices, or the like) from the sheet discharge accessory controller unit 130. In step S602, if the controller unit 100 recognizes the configuration of the sheet discharge accessory by receiving the configuration information and the control information of the sheet discharge accessory or if a time limit TL1 has passed (YES in step S602), the processing proceeds to step S607.

The starting point of the time limit TL1 is the time at which the controller unit 100 starts recognizing the configuration of the sheet discharge accessory, i.e., the time at which the controller unit 100 starts a standby state for waiting to receive the configuration information or the like of the sheet discharge accessory. The time limit TL1 is a time-out period for determining that no sheet discharge accessory is connected to the image forming apparatus, and, for example, is set to 3 seconds. When no sheet discharge accessory is connected to the image forming apparatus, no configuration information or the like is notified from the sheet discharge accessory controller unit 130. Accordingly, whether any sheet discharge accessory is connected to the image forming apparatus can be determined. Thereby, it is no longer necessary to provide a sensor in order to detect whether the sheet discharge accessory is connected to the image forming apparatus. Thus, cost saving can be achieved.

In step S602, if the time limit TL1 has not passed yet or the controller unit 100 has not recognized the sheet discharge accessory (NO in step S602), then the processing proceeds to step S603. In step S603, the controller unit 100 determines whether the image forming apparatus is recovering from the power saving mode. Whether the image forming apparatus is recovering from the power saving mode is determined based on whether there is notification that the image forming apparatus is recovering from the power saving mode from the image processing controller unit 150 when the power source is turned on. In step S603, if the controller unit 100 determines that the image forming apparatus is not recovering from the power saving mode, i.e., the image forming apparatus is in a normal power-on state when the hard switch 930 is turned on (NO in step S603), the process returns to step S602. In step S603, if the controller unit 100 determines that the image forming apparatus is recovering from the power saving mode (YES in step S603), the processing proceeds to step S604. In step S604, the controller unit 100 reads connecting state information of the sheet discharge accessory from the non-volatile RAM 120. The connecting state information stored in the non-volatile RAM 120 has been written in the above-described step S501. In step S605, the controller unit 100 determines, with reference to the connecting state information read from the non-volatile RAM 120, whether the sheet discharge accessory has been connected to the image forming apparatus before the image forming apparatus is shifted to the power saving mode.

In step S605, when the controller unit 100 determines that a sheet discharge accessory has been connected to the image forming apparatus before the image forming apparatus is shifted to the power saving mode (YES in step S605), the processing proceeds to step S606. Then, in step S606, the controller unit 100 determines if the time limit TL1 has passed or if the configuration of the sheet discharge accessory is recognized. In step S605, if the controller unit 100 determines that a sheet discharge accessory has not been connected to the image forming apparatus before the image forming apparatus is shifted to the power saving mode (NO in step S605), the processing immediately proceeds to step S607, i.e., the following step S606 described later below is skipped. In this case, the controller unit 100 continues the processing regarding that no sheet discharge accessory is connected to the image forming apparatus. Accordingly, unnecessary time to keep waiting for notification from the sheet discharge accessory can be eliminated when the image forming apparatus returns from the power saving mode in the case where no sheet discharge accessory is connected to the image forming apparatus.

In step S606, when the controller unit 100 recognizes the configuration of the sheet discharge accessory or when the time limit TL1 has passed (YES in step 606), the processing proceeds to step S607. When the time limit TL1 has not passed or the controller unit 100 has not recognized the configuration of the sheet discharge accessory (NO in step S606), the controller unit 100 continues to perform the processing in step S606. Consequently, if the controller unit 100 receives no configuration information or the like of the sheet discharge accessory even after the time limit has passed from the time at which a standby state starts in step S606, the processing proceeds to step S607. The controller unit 100 waits for determination of the configuration of the sheet discharge accessory in order for the controller unit 100 to obtain the latest state of the sheet discharge accessory, on an assumption that the state of the sheet discharge accessory may change during the power saving mode. The examples of the assumed change of the sheet discharge accessory during the power saving mode include a case where a sheet on the tray of the sheet discharge accessory is removed by the user during the power saving mode and a case where the door of the sheet discharge accessory is opened by the user during the power saving mode.

In step S607, when the controller unit 100 could recognize the configuration of the sheet discharge accessory in step S602 or step S606, the controller unit 100 determines that the sheet discharge accessory has the above-recognized configuration and thus notifies this information to the image processing controller unit 150. In step S608, the controller unit 100 subsequently starts a recovery processing from the power saving mode. The recovery processing from the power saving mode refers to a preparation operation for bringing the image forming apparatus into a state capable of forming an image, e.g., heating the fixing unit 917 to a temperature at which an image can be fixed (temperature adjustment), or the like. The recovery processing from the power saving mode includes processing to accelerate the polygon motor of the exposure control unit 910 to a predetermined speed, and processing to rotate the photosensitive drum 911 while applying a high-voltage in order to fix up the surface electrical potential of the photosensitive drum 911. The image processing controller unit 150 displays a screen regarding the sheet discharge accessory on the LCD display unit 201 on the operation unit 200 after the image processing controller unit 150 is notified with the configuration information of the sheet discharge accessory. Then, the controller unit 100 waits for the end of the recovery processing from the power saving mode, and allows to accept an operation of the start key 203 after the end of the recovery processing, i.e., allows to accept a command for starting the image forming processing (standby state). As described above, the controller unit 100 refers to the non-volatile RAM 120 in accordance with releasing of the power saving mode. Then, the controller unit 100 performs the reception processing for receiving the configuration information from the sheet discharge accessory when the non-volatile RAM 120 stores information that the sheet discharge accessory is connected. The controller unit 100 does not perform the reception processing when the non-volatile RAM 120 stores information that the sheet discharge accessory is not connected. In other words, the controller unit 100 allows the image forming apparatus to perform the image forming operation after waiting for receiving the configuration information from the sheet discharge accessory when the non-volatile RAM 120 stores information that the sheet discharge accessory is connected. The controller unit 100 allows the image forming apparatus to perform the image forming operation without waiting for receiving the configuration information from the sheet discharge accessory when the non-volatile RAM 120 stores information that the sheet discharge accessory is not connected.

Figure 7:
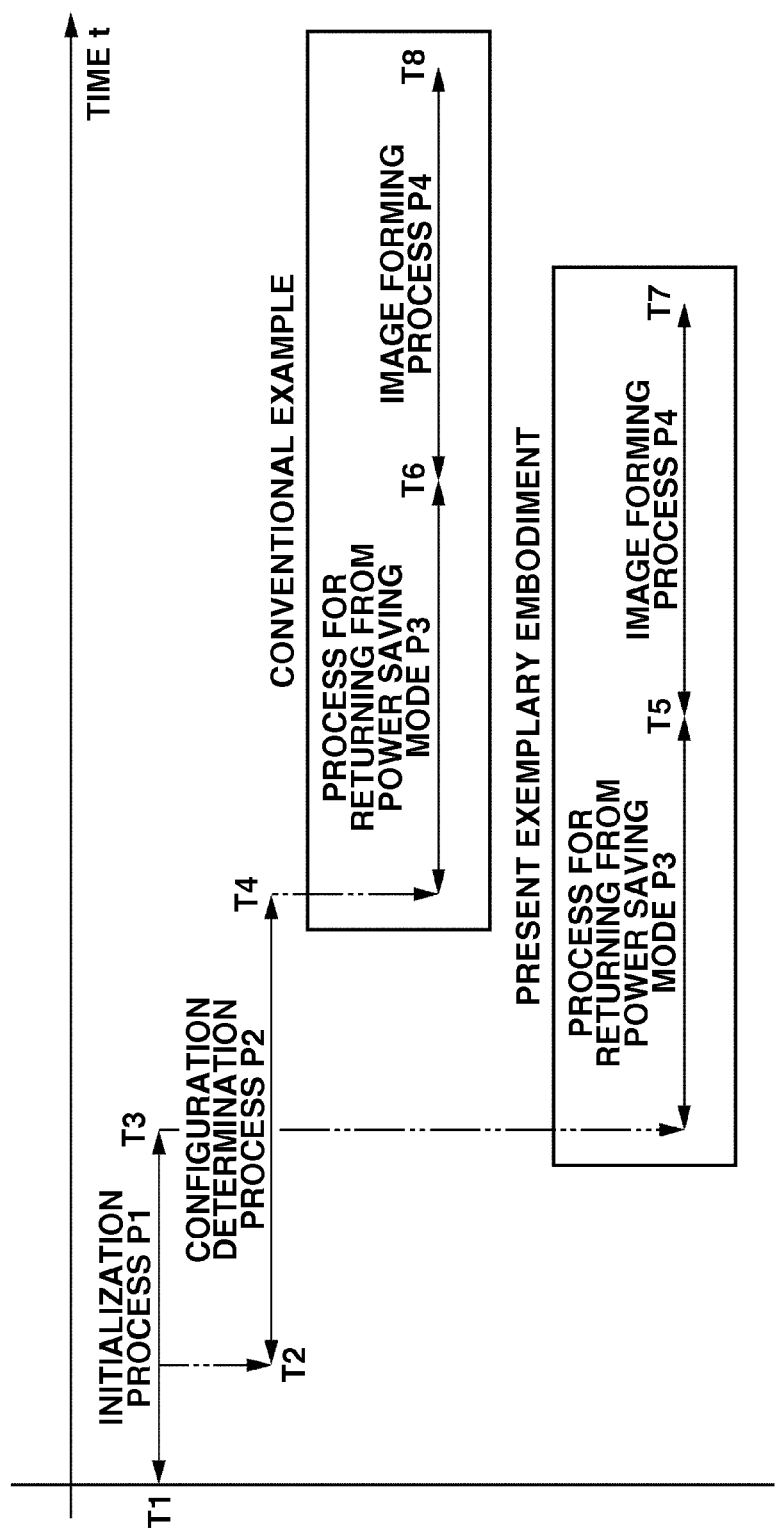
FIG. 7 is a timing chart illustrating a process when the image forming apparatus is recovering from the power saving mode.

FIG. 7 is a timing chart illustrating a comparison of the time required for recovering from the power saving mode between the present exemplary embodiment and a conventional example. T1 represents the timing at which a recovering trigger from the power saving mode is generated, i.e., the timing at which the soft power supply key 205 is pressed in the state of the power saving mode. At the timing T1, an initialization process P1 of the image processing controller unit 150 starts. At a timing T2, the remote signal 402 is turned on, and thereby the processing in the controller unit 100 and the processing in the sheet discharge accessory controller unit 130 start. The controller unit 100 starts a configuration determination process P2.

If no sheet discharge accessory is connected to the image forming apparatus, the configuration determination process of the conventional type takes time until a timing T4 since the controller unit 100 waits until the time limit TL1 has passed. Therefore, a process for recovering from the power saving mode P3 has been conventionally started at the timing T4. The process for recovering from the power saving mode P3 is the process performed in step S608 as described above. When the process for recovering from the power saving mode P3 ends at a timing T6, the image processing controller unit 150 allows accepting an instruction to start forming an image. When the image forming apparatus receives the instruction to start forming an image, the image forming apparatus performs an image forming process P4, which ends at a timing T8.

According to the present exemplary embodiment, the controller unit 100 is notified, at a timing T3, that the image forming apparatus is recovering from the power saving mode from the image processing controller unit 150, by which the initialization process P1 is finished in the above-described step S603. Then, if no sheet discharge accessory is connected to the image forming apparatus, the controller unit 100 starts the processing for recovering from the power saving mode P3 without waiting until the time limit TL1 has passed. Subsequently, when the process of the image forming apparatus recovering from the power saving mode P3 ends at a timing T5, the image processing controller unit 150 allows to accept the instruction to start forming an image. When the controller unit 100 accepts the instruction to start forming an image, the controller unit 100 performs the image forming process P4, which ends at a timing T7. As illustrated in FIG. 7, the timing, at which an image can be formed, of the present exemplary embodiment (timing T5) can be earlier than that of the conventional example (timing T6). Accordingly, the time period for the image forming apparatus to return from the power saving mode can be reduced, and the user's waiting time can be reduced.

Figure 8:
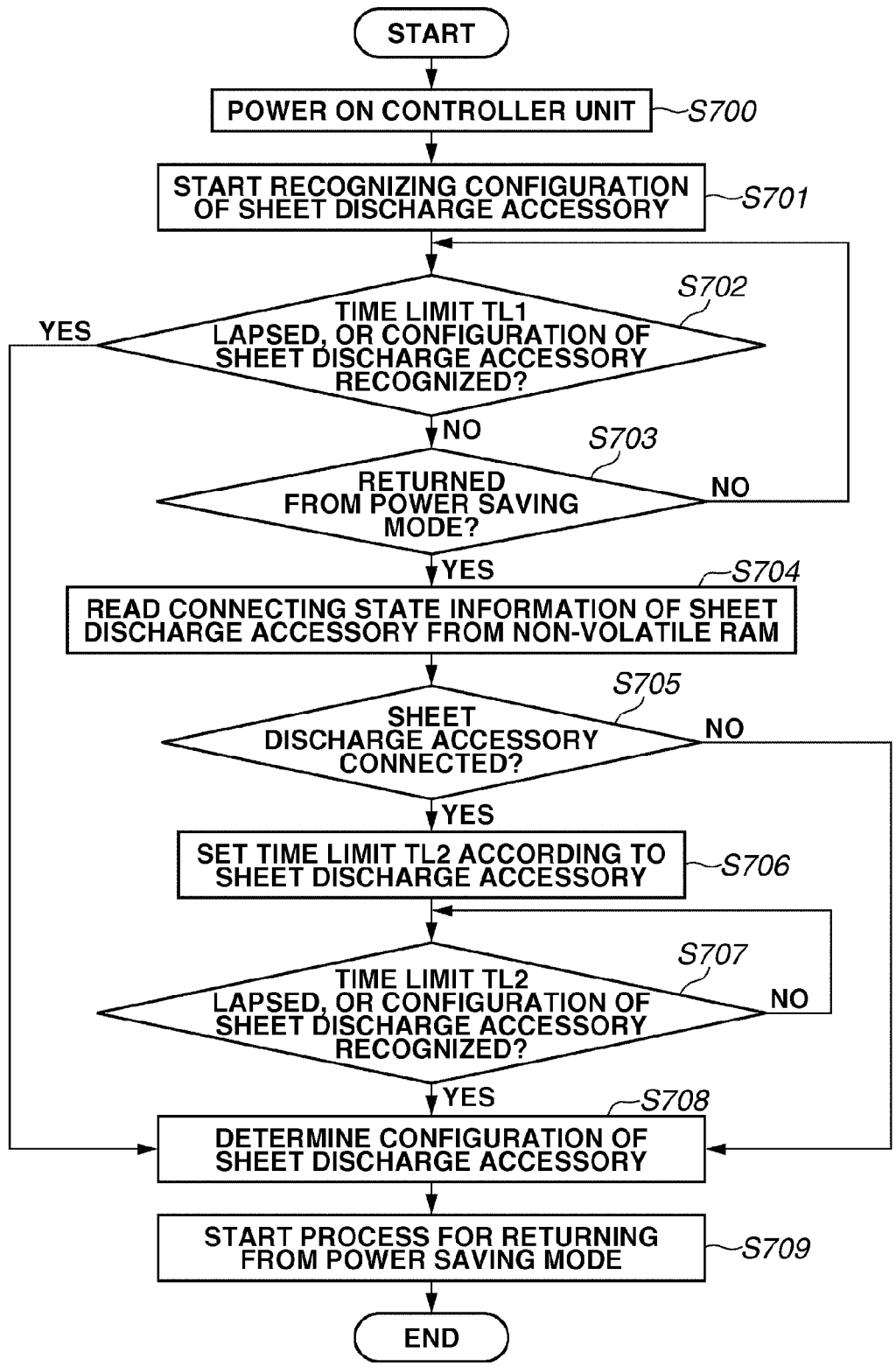
FIG. 8 is a flowchart illustrating a process when the image forming apparatus returns from the power saving mode.

FIG. 8 is a flowchart illustrating a control executed by the controller unit 100 according to a second exemplary embodiment. Since steps S700 through S705 and steps S708 through S709 correspond to steps S600 through S605 and steps S607 through S608 in FIG. 6, respectively, explanations thereof will be omitted here.

In step S705, when the controller unit 100 determines that the sheet discharge accessory has been connected to the image forming apparatus before the image forming apparatus is shifted to the power saving mode (YES in step S705), the processing proceeds to step S706. In step S706, a time limit TL2 is set based on a table as shown in FIG. 9 according to the type of the connected sheet discharge accessory. As illustrated in FIG. 9, if the sheet discharge accessory having been connected to the image forming apparatus before the image forming apparatus is shifted to the power saving mode is a stapler, a sorter, or a puncher, the time limit TL2 is set to 1 second. If the sheet discharge accessory connected to the image forming apparatus before the image forming apparatus is shifted to the power saving mode is an inserter or a stacker, the time limit TL2 is set to 2 seconds. The set time limits are differentiated in consideration of the difference in the timing at which configuration information from the sheet discharge accessory and the timing at which controlling information from the sheet discharge accessory are sent to the controller unit 100. The difference between the timings occurs because the time periods required for a start-up process, an internal check, and the like of the sheet discharge accessory, when the power source is turned on, are different from each other. Since the inserter or the stacker includes many objects to be controlled, a longer time is required for checking all of the objects thereof.

In step S707, when the controller unit 100 sets the time limit TL2, the controller unit 100 then determines whether the time limit TL2 has passed or the configuration of the sheet discharge accessory is recognized. In step S707, if the controller unit 100 recognizes the configuration of the sheet discharge accessory or the time limit TL2 has passed (YES in step S707), the processing proceeds to step S708. However, if the time limit TL2 has not lapsed yet or the configuration of the sheet discharge accessory has not been recognized yet (NO in step S707), the controller unit 100 continues the processing of step S707.

With the setting of the time limit TL2 as described above, if the sheet discharge accessory has been removed from the image forming apparatus during the power saving mode, the controller unit 100 can start the process for recovering from the power saving mode earlier than the time-out of the time limit TL1 (for example, 3 seconds). Further, if an additional sheet discharge accessory is connected to the image forming apparatus during the power saving mode and when the controller unit 100 receives the configuration information or the like of the connected sheet discharge accessory from the sheet discharge accessory after the step proceeds to the processing for recovering from the power saving mode, the controller unit 100 needs to re-determine the configuration of the connected sheet discharge accessory. When the controller unit 100 re-determines the configuration of the sheet discharge accessory, the controller unit 100 performs the processing for recovering from the power saving mode again from the beginning.

As described above, the time required for recovering from the power saving mode can be reduced by storing the connecting state information of the sheet discharge accessory before the image forming apparatus is shifted to the power saving mode and reducing the time-out period based on the connecting state information when the image forming apparatus returns from the power saving mode.

In the above-described exemplary embodiment, the sheet discharge accessory is used as an example. However, the present invention can also be applied to accessories such as a document feeder used for feeding documents to the document reading apparatus and a paper feeder used for feeding sheets to the image forming apparatus. In the above-described exemplary embodiment, the non-volatile RAM 120 stores whether the sheet discharge accessory is connected before switching into the power saving mode. However, the present invention can also be applied to the non-volatile RAM 120 storing whether the sheet discharge accessory is connected before the power supply is switched off. In this case, the controller unit 100 refers to the non-volatile RAM 120 in accordance with the switch on of the power supply. Then, the controller unit 100 allows the image forming apparatus to perform an image forming operation after receiving the configuration information from the sheet discharge accessory when the non-volatile RAM 120 stores information that the sheet discharge accessory is connected. The controller unit 100 allows the image forming apparatus to perform the image forming operation without waiting for receiving the configuration information from the sheet discharge accessory when the non-volatile RAM 120 stores information that the sheet discharge accessory is not connected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-155358 filed on Jun. 13, 2008, which is hereby incorporated by reference herein in its entirety.

What is claimed is:

1. An image forming apparatus, to which an accessory device is connectable, comprising:
    an image forming unit configured to form an image on a sheet;
    a receiving unit configured to receive configuration information regarding the accessory device from the accessory device;
    a storage unit configured to store connection information on whether the accessory device is connected;
    a control unit configured to refer to the stored connection information in accordance with a release of the power saving mode and when the stored connection information that was stored before the image forming apparatus entered into power saving mode indicates that the accessory device is connected, initiate a preparation processing for preparing the image forming unit into a state configured to form an image after the receiving unit receives configuration information, the configuration information indicating a state of the accessory, from the accessory device, in a case where the receiving unit has received configuration information within a predetermined time period, and
    initiate the preparation processing after the predetermined time period has passed in a case where the receiving unit has not received configuration information within the predetermined time period,
    when the stored connection information that was stored before the image forming apparatus entered into power saving mode indicates that the accessory device is not connected, initiate a preparation processing for preparing the image forming unit into a state configured to form an image without waiting for reception of the configuration information.

2. The image forming apparatus according to claim 1, wherein, the control unit determines whether the power saving mode is released according to start of a power supply and in a case where a determination result is that the power saving mode is not released, performs the reception processing, and determines whether the accessory device is connected to the image forming apparatus based on whether the receiving unit receives the configuration information from the accessory device, and generates the connection information based on a determination result.

3. The image forming apparatus according to claim 2, wherein the control unit determines the accessory device is not connected to the image forming apparatus when the receiving unit does not receive the configuration information from the accessory device within a predetermined period since a starting of the reception processing.

4. The image forming apparatus according to claim 1 further comprising:
an operation unit configured to input an instruction about a power saving mode; and
a power supply unit configured to control the power supply to the control unit and the image forming unit according to the instruction input by the operation unit,
wherein power to be supplied to the control unit and the image forming unit is saved in the power saving mode.

5. The image forming apparatus according to claim 1, wherein, the control unit, in accordance with an instruction for switching to the power saving mode, allows the switching to the power saving mode after storing to the storage unit the connection information on whether the accessory device is connected to the image forming apparatus.

6. The image forming apparatus according to claim 1, wherein, the control unit, in accordance with releasing of the power saving mode, performs a recovering processing from the power saving mode after performing the reception processing when the storage unit stores the connection information that the accessory device is connected, and performs the recovering processing without performing the reception processing when the storage unit stores information that the accessory device is not connected.

7. The image forming apparatus according to claim 1, wherein the accessory device includes at least one of a sheet discharge accessory, a paper feeding accessory, and a document feeding accessory.

8. The image forming apparatus according to claim 1, wherein the accessory device includes at least one of a stapler, a sorter, a puncher, an inserter, and a stacker.

9. The image forming apparatus according to claim 1, wherein the predetermined time period is set according to the stored connection information.

10. The image forming apparatus according to claim 1,
wherein the accessory device is a sheet discharging accessory, and
wherein the configuration information includes information on whether there is a staple or not.

* * * * *